US006879604B2

(12) United States Patent
Cook

(10) Patent No.: US 6,879,604 B2
(45) Date of Patent: Apr. 12, 2005

(54) WAVEGUIDE LASER DEVICES

(75) Inventor: Gary Cook, Worcs (GB)

(73) Assignee: Qinetiq Limited, Farnborough (GB)

( * ) Notice: Subject to any disclaimer, the term of this patent is extended or adjusted under 35 U.S.C. 154(b) by 133 days.

(21) Appl. No.: 10/148,678

(22) PCT Filed: Dec. 1, 2000

(86) PCT No.: PCT/GB00/04579

§ 371 (c)(1),
(2), (4) Date: Jun. 26, 2002

(87) PCT Pub. No.: WO01/41265

PCT Pub. Date: Jun. 7, 2001

(65) Prior Publication Data

US 2003/0048815 A1 Mar. 13, 2003

(30) Foreign Application Priority Data

Dec. 3, 1999 (GB) .............................. 9928475

(51) Int. Cl.[7] ................................ H01S 3/30
(52) U.S. Cl. ................ 372/3; 372/6; 372/39; 372/48
(58) Field of Search .................... 372/3, 6, 39, 48

(56) References Cited

U.S. PATENT DOCUMENTS

| 4,136,316 A | | 1/1979 | Chicklis et al. ............ 331/94.5 |
|---|---|---|---|
| 4,173,738 A | | 11/1979 | Boling et al. ................ 330/4.3 |
| 4,803,439 A | | 2/1989 | Ryan ............................ 330/4.3 |
| 5,122,178 A | | 6/1992 | Omi et al. ...................... 65/33 |
| 5,418,182 A | | 5/1995 | Ford .......................... 437/129 |
| 5,434,878 A | | 7/1995 | Lawandy ..................... 372/43 |
| 5,717,517 A | | 2/1998 | Alfano et al. ............... 359/342 |
| 5,778,014 A | * | 7/1998 | Islam ............................ 372/6 |
| 5,815,518 A | | 9/1998 | Reed et al. ..................... 372/6 |
| 5,858,891 A | | 1/1999 | Auzel et al. .................... 501/3 |
| 5,881,083 A | * | 3/1999 | Diaz-Garcia et al. ......... 372/39 |
| 6,289,027 B1 | * | 9/2001 | Lawrence et al. ............. 372/6 |
| 6,525,872 B1 | * | 2/2003 | Ziari et al. ............... 359/341.3 |

FOREIGN PATENT DOCUMENTS

| EP | 0 743 721 A | 11/1996 | ............. H01S/3/06 |
|---|---|---|---|
| GB | 2 289 137 A | 11/1995 | ............. G02F/1/37 |

OTHER PUBLICATIONS

Brown et al; "900–NM ND:TI:LINB03 Waveguide Laser"; Optics Letters, US, Optical Society of America, Washington, vol. 22, No. 23, Dec. 1, 1997, pp. 1778–1780; XP000735861.

Hoven et al; "Net Optical Gain at 1.53 UM in ER–Doped AI2O3 Waveguides on Silicon"; Applied Physics Letters, US, American Institute of Physics, NY, vol. 68, No. 14, Apr. 1, 1996, pp. 1886–1888, XP000585100.

Oguma et al; "Tunable ER–Doped Y–Branched Waveguide Laser"; IEEE Photonics Technology Letters, US, IEEE Inc. NY, vol. 6, No. 5, May 1, 1994, pp. 586–587, XP000446966.

Perkins et al; "Light Amplification in a Disordered Raman Medium"; Elsevier Science B.V.; Apr. 15, 1999, pp. 191–194, XP002163061.

* cited by examiner

Primary Examiner—Don Wong
Assistant Examiner—Leith Al-Nazer
(74) Attorney, Agent, or Firm—Nixon & Vanderhye P.C.

(57) ABSTRACT

A continuous wave laser device (40) comprises a convoluted path or fiber (43) of Raman laser material that has been micromachined on to a substrate, the laser material fiber being covered by protective cladding (30). A 1 cm diameter substrate can have tens of meters of fiber fabricated on it and with a suitable choice for the laser material, e.g. Diamond, can output tens of hundreds of Watts of laser power. One possible use envisaged is as multicolor laser diodes, for example for projection television systems.

26 Claims, 6 Drawing Sheets

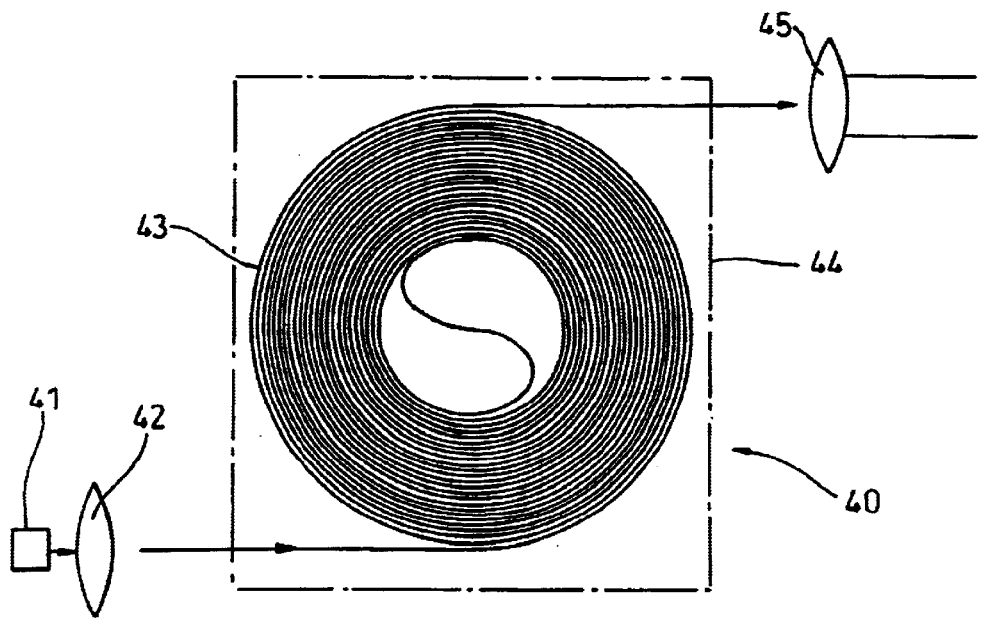
Fig. 4
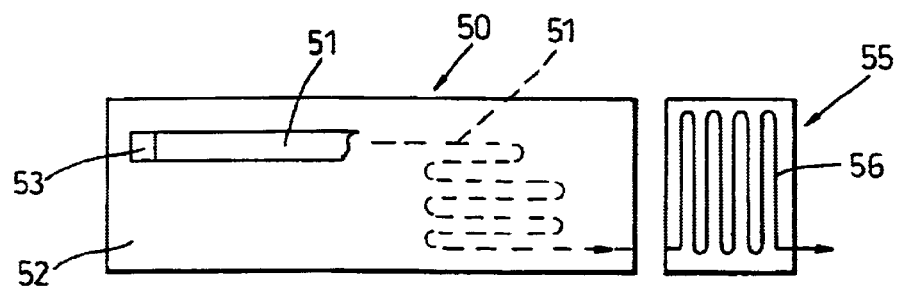
Fig. 5A  Fig. 5B
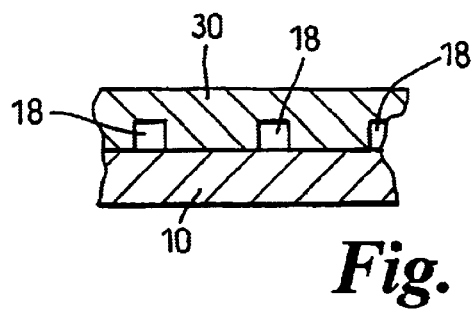
Fig. 6

Spontaneous Raman scattering parameters of crystals

| Material | Lattice space group | Molecular group | Raman freq. $\Omega_R$ (cm$^{-1}$) | Raman line width $\Delta\Omega_R$ (cm$^{-1}$) | Integral cross section $\Sigma_{int}$ (a.u.) | Peak intensity $\Sigma_{peak}$ (a.u.) | Scattering geometry of excitation K | Scattering geometry of E |
|---|---|---|---|---|---|---|---|---|
| Diamond | $O_h^7$ | | 1332.9 | 2.7 | 100 | 100 | $\|C_3$ | $\perp C_3$ |
| SiO$_2$ | $D_3^4$ | [SiO$_4$] | 464.5 | 7.0 | 2.2 | 1.2 | $\perp C_3$ | $\|C_3$ |
| Nitrates and calcite | | | | | | | | |
| Ba(NO$_3$)$_2$ | $T_h^6$ | [NO$_3$] | 1048.6 | 0.4 | 21 | 63 | $\|C_3$ | $\|C_3$ |
| NaNO$_3$ | $D_{3d}^6$ | [NO$_3$] | 1069.2 | 1.0 | 23 | 44 | $\|C_3$ | $\perp C_3$ |
| CaCO$_3$ | $D_{3d}^6$ | [CO$_3$] | 1086.4 | 1.2 | 6.0 | 10.6 | $\|C_3$ | $\perp C_3$ |
| Tungstates | | | | | | | | |
| CaWO$_4$ | $C_{4h}^6$ | [WO$_4$] | 910.7 | 4.8 | 47 | 18.6 | $\perp C_4$ | $\|C_4$ |
| SrWO$_4$ [a] | $C_{4h}^6$ | [WO$_4$] | 921.5 | 3 | – | – | | |
| BaWO$_4$ [a] | $C_{4h}^6$ | [WO$_4$] | 926.5 | 2.2 | – | – | | |
| NaY(WO$_4$)$_2$ [a] | $C_{4h}^6$ | [WO$_4$] | 918 | 15 [b] | – | – | | |
| KGd(WO$_4$)$_2$ | $C_{2h}^6$ | [WO$_4$] | 901 | 5.4 | 54 | 25 | $\|C_3$, $\perp C_3$ | $\|C_4$, $\perp C_4$ |
| KGd(WO$_4$)$_2$ | $C_{2h}^6$ | [WO$_4$] | 901 | 5.4 | 43 | 22 | $\|C_3$, $\perp C_3$ | $\|C_4$, $\perp C_4$ |
| KGd(WO$_4$)$_2$ | $C_{2h}^6$ | [WO$_6$] | 768 | 6.4 | 19 | 8.2 | $\|C_3$, $\perp C_3$ | $\|C_4$, $\perp C_4$ |
| KGd(WO$_4$)$_2$ | $C_{2h}^6$ | [WO$_6$] | 768 | 6.4 | 65 | 29 | $\|C_3$, $\perp C_3$ | $\|C_4$, $\perp C_4$ |
| KY(WO$_4$)$_2$ | $C_{2h}^6$ | [WO$_4$] | 905.6 | 7 | 50 | 24 | $\|C_3$, $\perp C_3$ | $\|C_4$, $\perp C_4$ |
| KY(WO$_4$)$_2$ | $C_{2h}^6$ | [WO$_4$] | 905.6 | 7 | 45 | 22 | $\|C_3$, $\perp C_3$ | $\|C_4$, $\perp C_4$ |
| KY(WO$_4$)$_2$ | $C_{2h}^6$ | [WO$_6$] | 767.4 | 8.4 | 20 | 9 | $\|C_3$, $\perp C_3$ | $\|C_4$, $\perp C_4$ |
| KY(WO$_4$)$_2$ | $C_{2h}^6$ | [WO$_6$] | 767.4 | 8.4 | 64 | 24 | $\|C_3$, $\perp C_3$ | $\|C_4$, $\perp C_4$ |
| KYb(WO$_4$)$_2$ | $C_{2h}^6$ | [WO$_4$] | 908 | 7.4 | 48 | 24 | $\|C_3$, $\perp C_3$ | $\|C_4$, $\perp C_4$ |
| KYb(WO$_4$)$_2$ | $C_{2h}^6$ | [WO$_4$] | 908 | 7.4 | 48 | 24 | $\|C_3$, $\perp C_3$ | $\|C_4$, $\perp C_4$ |
| KYb(WO$_4$)$_2$ | $C_{2h}^3$ | [WO$_6$] | 757 | 15 [b] | 25 [b] | 13.8 [b] | $\|C_3$, $\perp C_3$ | $\|C_4$, $\perp C_4$ |
| KYb(WO$_4$)$_2$ | $C_{2h}^6$ | [WO$_6$] | 757 | 15 [b] | 70 [b] | 25 [b] | $\|C_3$, $\perp C_3$ | $\|C_4$, $\perp C_4$ |
| Molybdates | | | | | | | | |
| CaMoO$_4$ | $C_{4h}^6$ | [MoO$_4$] | 879.3 | 5.0 | 64 | 34 | $\|C_3$ | $\|C_4$ |
| SrMoO$_4$ | $C_{4h}^6$ | [MoO$_4$] | 887.7 | 2.8 | 55 | 51 | $\|C_3$ | $\|C_4$ |
| BaMoO$_4$ | $C_{4h}^6$ | [MoO$_4$] | 892.4 | 2.1 | 52 | 64 | $\|C_3$ | $\|C_4$ |
| Iodate and niobates | | | | | | | | |
| LiIO$_3$ | $C_6^6$ | [IO$_3$] | 821.6 | 5.0 | 54 | 25 | $\|C_3$ | $\|C_4$ |
| LiNbO$_3$ | $C_{3v}^6$ | [NbO$_6$] | 872 | 21.4 | 44 | 5 | $\|C_3$ | $\|C_4$ |
| LiNbO$_3$ | $C_{3v}^6$ | [NbO$_6$] | 632 | 27 | 166 | 18 | $\|C_3$ | $\|C_4$ |
| LiNbO$_3$ | $C_{3v}^6$ | [NbO$_6$] | 250 | 28 | – | 22 | $\|C_3$ | $\|C_4$ |
| LaNbO$_3$ | $C_{2h}^3$ | [NbO$_4$] | 805 | 9 | 22 | 7.1 | $\|C_3$ | $\|C_4$ |
| Phosphates | | | | | | | | |
| Ca$_5$(PO$_4$)$_3$F | $C_{6h}^2$ | [PO$_4$] | 964.7 | 2.8 | 3.4 | 3.8 | $\|C_6$ | $\|C_6$ |
| Sr$_5$(PO$_4$)$_3$F | $C_{6h}^2$ | [PO$_4$] | 950.3 | 2.8 | 3.4 | 3.8 | $\perp C_6$ | $\|C_6$ |

[a] Polycrystal sample
[b] Line with inhomogeneous splitting

*Fig. 12*

Estimated Raman gain coefficients for excitation at 1064 nm

| Substance | Raman shift / cm⁻¹ | Gain coeff. for 1st Raman line (cm.GW⁻¹) | 1st Raman wavelength / nm | 2nd Raman wavelength / nm | Trans-Mission |
|---|---|---|---|---|---|
| LiNbO₃ | 253/274 | | | | |
| | 631 | 11.5 | 1141 | 1229 | Y |
| KTP | 268 | 23.1 | 1095 | 1128 | Y |
| | 694 | 15.7 | 1149 | 1248 | Y |
| Ba(NO₃)₂ | 1047 | 13.2 | 1197 | 1369 | Y |
| LiIO₃ | 782 | 11.6 | 1161 | 1276 | Y |
| ZGP | 330 | 52.2 | 1103 | 1144 | N |
| | 396 | 32.9 | 1111 | 1162 | N |
| SrMoO₄ | 326 | 6.8 | 1102 | 1143 | Y |
| | 795 | 5.0 | 1162 | 1281 | Y |
| | 886 | 19.8 | 1175 | 1311 | Y |
| CaMoO₄ | 322 | | 1102 | 1142 | Y |
| | 793 | | 1162 | 1280 | Y |
| | 878 | 14.2 | 1174 | 1308 | Y |
| Nd:GdVO₄ | 808 | | 1164 | 1285 | Y |
| | 823 | 7.1 | 1166 | 1290 | Y |
| | 883 | 20.8 | 1174 | 1310 | Y |
| Ho:YAP | 495 | 28.9 | 1123 | 1189 | Y |
| Ho:YAG | 833 | | 1167 | 1293 | Y |
| CaCO₃ | 1088 | 4.1 | 1203 | 1385 | Y |
| PbCl₂ | 180 | | 1085 | 1106 | |
| KTA | 700 | 7.2 | 1150 | 1250 | Y |
| | 340 | | 1104 | 1147 | Y |
| | 267 | | 1095 | 1128 | Y |
| RTA | 665 | 37.8 | 1145 | 1239 | |
| | 333 | 14.4 | 1103 | 1145 | |
| YLF | 606 | 152.8 | 1137 | 1222 | Y |
| | 606 | 205.7 | 1137 | 1222 | Y |

*Fig. 13*

WAVEGUIDE LASER DEVICES

This application is the US national phase of international application PCT/GB00/04579, filed in English on 1 Dec. 2000, which designated the US. PCT/GB00/04579 claims priority to GB Application No. 9928475.4 filed 3 Dec. 1999. The entire contents of these applications are incorporated herein by reference.

BACKGROUND OF THE INVENTION

1. Field of the Invention

This invention is concerned with lasers, and devices and optical systems that contain lasers. It is especially, but not exclusively, concerned with continuous wave lasers, for example continuous wave Raman lasers.

2. Discussion of Prior Art

It is known to produce laser light by pumping a single, large, laser crystal with light of an appropriate wavelength. Solid state Raman lasers are known, again using a large single crystal of Raman laser material. It is known to propose optical fibres made out of glass which when there are kilometres of fibre produce Raman laser light (when optically pumped).

SUMMARY OF THE INVENTION

It is an aim of the present invention to provide another laser device.

According to a first aspect, the invention comprises a laser device having a substrate which carries a fabricated fibre or waveguide of laser material.

Thus, no large single crystal of laser material is required: a fibre of laser material is fabricated upon a substrate. The fibre is fabricated in-situo on the substrate.

Preferably the laser material has been deposited upon or bonded to the substrate. Preferably the fibre or waveguide of laser material has been machined from a two-dimensional layer. Preferably the fibre or waveguide has a folded path. Preferably there is a relatively large length of fibre on a relatively small area of substrate. Preferably the fibre or waveguide defines a winding path at least a portion of which lies substantially in a common plane. This can result in a large surface area of an array of fibre, which can allow good heat extraction. Preferably the substrate has a flat surface occupying a plane and the fibre or waveguide lies at the surface, substantially at or in the plane. Preferably the fibre or waveguide has a plurality of line portions which follow substantially the same path, but spaced apart. The line portions may extend in a substantially straight line, or they may extend in a generally spiral, circular or arcuate path. The fibre or waveguide may form an array of lines. The fibre or waveguide may have a length of the order of a meter, or longer.

Preferably the laser device has a body comprising the substrate and the fibre or waveguide, and the body has an outer surface of substantial surface area adapted to be cooled, with at least parts of the fibre or waveguide being close enough to the surface to be cooled effectively in use. The device may include cooling means provided to cool the surface. The surface may be substantially flat, or it could be curved. The body may have spaced-apart generally parallel surfaces with the fibre or waveguide provided between them. The device may comprise a plate-like body.

The device may have a fibre or waveguide with a diameter of the order of $100\mu$ or less, and preferably of the order of a few microns, for example $1–10\,\mu$u, most preferably around $5\mu$.

Parts of the fibre or waveguide at different points along its length may be disposed adjacent each other, preferably with a spacing of the order of a few microns, or of the order of tens of microns, or of the order of hundreds of microns. The line portions may be spaced apart by a distance of the order of a few microns (or less), or of the order of tens of microns, or of the order of hundreds of microns, or more.

The device may comprise an incorporated diode provided in situ in or on the substrate. The diode may be a solid state laser diode adapted to output its laser light into the fibre or waveguide. The diode may comprise a semiconductor laser.

The laser material may comprise Raman laser material, or semiconductor laser material. There may be more than one kind of laser material (e.g. Raman laser material) in the laser material layer or fibre. Alternatively or additionally fibres of a first composition may be coupled with fibres of a second, different, composition. This may increase the number of Raman lines generated in use.

There is preferably a protective coating, cladding, or covering extending over the fibre or waveguide. Preferably the protective coating is a glass or polymer. The substrate may also be glass. The protective coating has a different refractive index to the laser material. The protective coating or covering may be made of the same material as the substrate, or may have a substantially similar refractive index to that of the substrate at the wavelength of operation of the device. The refractive index of the fibre or waveguide and that of the cladding may be of the order of 0.1 or more (or less) different, or of the order of 0.01 or more (or less) different, or of the order of 0.001 or more (or less) different.

The device may comprise a three-dimensional body. The fibre or waveguide may be provided on, in, or near, at least some of the external surfaces of the body, or follow at least some of the external surfaces.

The device may comprise a plurality of bodies each of which has a fibre or waveguide formed in or on a substrate, with the fibres or waveguides of the bodies being operatively coupled.

The device may have a first body or region when the laser material is of a first kind, and a second body or region where the laser material is of a second, different, kind.

The device may have a pump laser. The device may be adapted to be pumped by light encountering the elongate length of the fibre or waveguide in a direction generally parallel to the elongate direction of the fibre at the region of the fibre where the light enters, or transverse to (e.g. substantially normal to) the elongate direction of the fibre or waveguide at the place where the light encounters it; by light encountering a planar array of fibre or waveguide transversely to the plane of the array; or by light encountering a planar array of fibre or waveguide generally in the plane of the array.

The device may have an input lens and/or an output lens. The device is preferably a continuous wave laser device, but it could be a pulsed laser device.

According to a second aspect the invention comprises a method of manufacturing a laser device comprising forming an elongate fibre or waveguide of laser material on or in a substrate.

Thus, instead of drawing a long optical fibre or crystal of laser material, it is intended that the fibre be formed supported by a substrate.

The fibre or waveguide may be deposited on the substrate directly as an elongate fibre or substrate. Alternatively, the fibre or waveguide may be fabricated from a layer of laser material by removing regions of laser material from the layer. Thus, one way of looking at part of the invention is the formation of a substantially one-dimensional fibre from a substantially two-dimensional sheet or layer of laser material.

The method may comprise bonding a layer of laser material to the substrate. The layer may have its thickness reduced by a thickness-reducing operation, such as polishing. A layer of the desired thickness may be deposited by a materials deposition technique, such as sputtering, ion plating, an epitaxial deposition technique (e.g. vapour or liquid phase) or any other suitable technique. The layer (deposited as particles or attached in bulk as a preformed layer) may have a depth that is chosen to be the diameter of the fibre. The layer may have a depth of about 5 $\mu$m, and is preferably in the range 1 $\mu$m to 10 or 20 $\mu$m, but it could be thinner or thicker.

The layer of laser material may be patterned to produce an elongate fibre or waveguide. The patterning may comprise micromachining using a known micromachining technique such an etching process, or for example ion beam etching, laser etching, photolithographic chemical etching, or another etching materials removal technique.

The patterning may comprise providing a folded path/fibre of laser material, preferably a pattern of lines of laser material, possibly an array of lines. The lines may comprise parts of the same fibre or waveguide and adjacent lines may be formed to extend in generally the same direction.

Protective cladding, or coating, may be applied over the formed fibre or waveguide. The cladding may comprise a layer of glass or polymer material.

The method may comprise mounting a laser diode on the substrate, or creating a laser diode in or at the substrate, and coupling the fibre or waveguide to the diode. It will be appreciated that if the substrate is a semiconductor material, such as silicon, it may be possible to create a laser diode and/or the fibre by appropriate doping of the substrate.

The method may comprise creating lines of laser material which extend over one or more surfaces of a three-dimensional body.

The method may comprise making a laser body by coupling together the fibres/waveguides of a plurality of smaller bodies. The coupled smaller bodies may form a larger body which has the fibre extending within the main volume of the larger body. The bodies may have the same or different laser materials. Alternatively or additionally the laser material of a laser body may comprise more than one kind of laser material, thereby providing the ability to have different Raman emission lines/radiation.

The method preferably comprises depositing a surface film of laser material and removing parts of the film to leave behind a fibre, which preferably meanders over the surface.

According to a third aspect, the invention comprises the use of patterning techniques to produce an elongate fibre or waveguide of laser material from a film or layer of laser material, in order to produce a laser device.

Preferably the method comprises using micromachining techniques to produce the fibre.

According to a fourth aspect the invention comprises having a substrate material and changing the refractive index of part of the substrate material so as to create a laser fibre or waveguide path.

The substrate material can have its refractive index changed by:
(i) removal of the substrate material in certain regions, for example to leave behind a fibre or waveguide of substrate material, the regions adjacent the fibre or waveguide having had their refractive index changed by changing the material itself from original substrate material, for example to a non-linear material (e.g. a protective coating applied after laser substrate material removal); or
(ii) deposition of laser material onto the substrate to provide a different material as the laser path (i.e. changing the substrate material/overlying it with a fibre material); or
(iii) diffusion/migration of substances into or out of parts of the substrate so as to change the material composition of part of the substrate so as to create a laser fibre or waveguide path in the material of the substrate.

Option (iii) could comprise using a pattern to change the nature of the substrate in a corresponding pattern. The pattern could be applied using a mask. The migration of substances could be selective in-diffusion/in-migration of substances (e.g. ions) into the substrate (e.g. ions diffusing in at selected regions which define the fibre or waveguide pathway). Alternatively, the migration could be selective out-diffusion of substances from the substrate in selected regions so as to define a path for the laser fibre or waveguide.

The diffusion technique could be thermal diffusion. The ions could be metal ions (e.g. Titanium), or semi-metal ions, or transition metal ions.

The method may comprise applying to the substrate a coating or pattern of refractive index-changing material which causes the refractive index of the substrate beneath it to change, preferably by migrating substances (e.g. ions) out of the refractive-index changing material and into the substrate, or vice-versa.

Controlling the length of time that the refractive-index changing material resides on the substrate, and/or their temperature during the time they are in contact can change the rate of migration of the refractive-index changing substances from one to the other, and can control the penetration depth of the volume of substrate that has its refractive index changed. The refractive index-changing material may be removed from the substrate after a predetermined time at predetermined conditions.

It is preferred to apply a serpentine pattern of refractive index-changing material to the surface of the substrate and to cause a corresponding fibre or waveguide to be created by in-diffusion of ions (or other substances) into the substrate—change the refractive index of the substrate that is to be the laser fibre or waveguide. However, it is possible to envisage the reverse—diffusing in, or out, substances to change the refractive index of the substrate that surrounds what is to be the laser fibre or waveguide, changing the surrounding medium and leaving the material of the laser fibre or waveguide unchanged.

According to a fifth aspect the invention comprises a fibre or waveguide of laser material in accordance with the first aspect of the invention, or made in accordance with the second, third, or fourth aspects of the invention.

A search has been performed since making the present invention and this has found: EP 0 325 251 which discloses using a channel waveguide as a collimator for a slab waveguide; U.S. Pat. No. 5,888,700 which shows a single Raman crystal laser with an optical fibre attached to it and is directed at Bragg reflector technology to enhance Raman emissions in glass fibres; U.S. Pat. No. 5,726,796 which discloses an optical amplifier with circularly curved and crossing waveguides; and U.S. Pat. No. 5,080,503 which discloses an optical waveguide made of a rare earth element deposited on a flat glass surface by diffusion of the rare earth material through a mask.

BRIEF DESCRIPTION OF THE DRAWINGS

Embodiments of the invention will now be described by way of example only with reference to the accompanying drawings, of which:

FIG. 4 shows a laser device having a patterned laser fibre;

FIG. 5A shows another laser device in accordance with the invention;

FIG. 5B shows an add-on unit for use with FIG. 5A;

FIG. 6 shows the embodiment of FIG. 1 after a cladding layer has been applied over the laser fibre;

FIGS. 12 and 13 show tables listing suitable Raman laser materials, and their properties.

DETAILED DISCUSSION OF EMBODIMENTS

Figure 1:
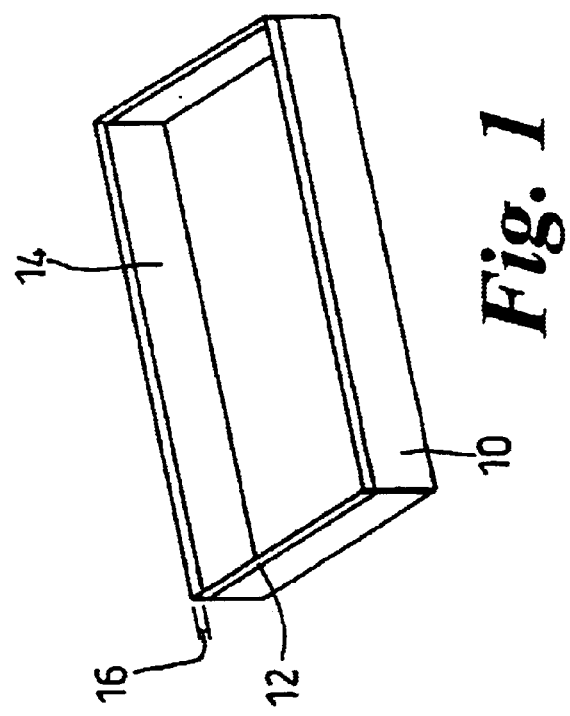
FIG. 1 shows a layer of laser material deposited on a substrate.

FIG. 1 shows a substrate 10, such as a glass substrate, which is overlaid by a layer 12 of laser material 14. In this example, the laser material is a Raman laser material, for example Diamond or Barium Nitrate. It has a depth, 16, of about 2–10μ.

Figure 3:
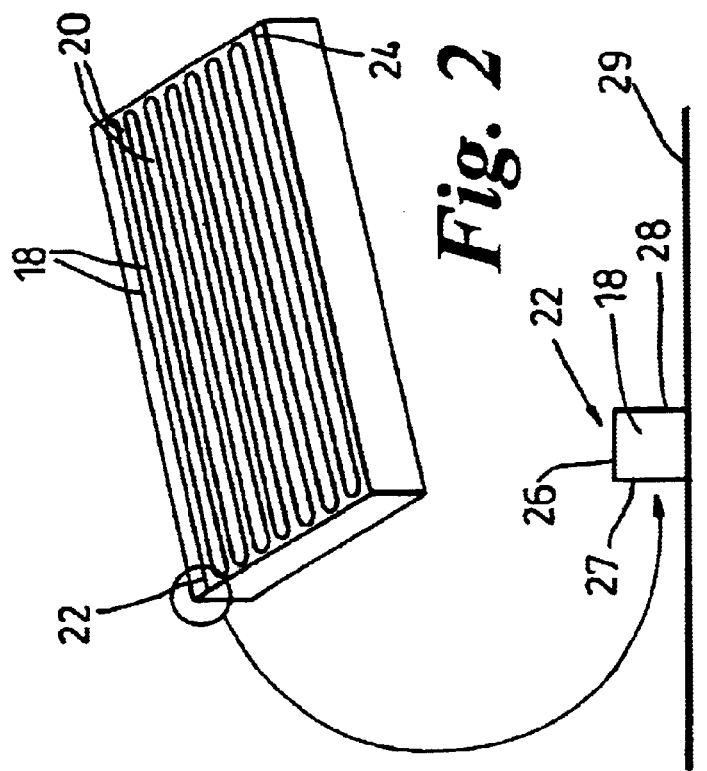
FIG. 3 Shows a cross-section through part of FIG. 2.

The layer 12 is patterned to remove laser material 14 from the substrate 12 and leave behind a folded, convoluted, path or fibre 18 of laser material with spaces/grooves 20 between laterally adjacent portions of the patterned fibre 18 where no laser material exists (or at least where not enough laser material exists to operate properly as a laser). Thus, a continuous winding fibre, fibre 18, is formed supported by the substrate 10. The fibre 18 has a width of about 4 to 8 μm and has a first end 22 and a second end 24. FIG. 3 shows an end view of the substrate, or carrier, 10 and shows a part of the end 22, having a top surface 26, and spaced side surfaces, or walls, 27 and 28 extending away from an upper surface 29 of the substrate 10.

Figure 2:
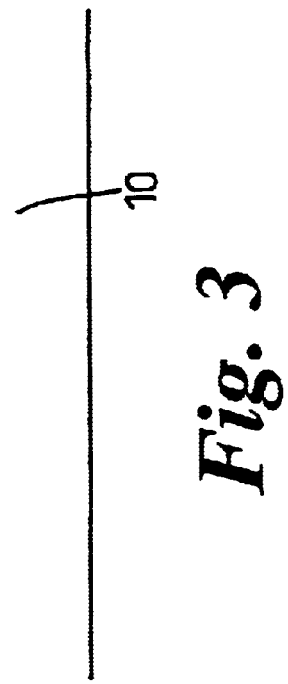
FIG. 2 shows the layer of FIG. 1 patterned into a meandering laser fibre.

The structure of FIG. 2 may be used as a laser as it stands in FIG. 2, but it is preferred to apply a protective layer over the fibre 18. FIG. 6 shows a glass layer 30 applied over the serpentine fibre 18. The layer 30 of FIG. 6 has substantially the same refractive index as layer 10, and indeed may be of the same, or substantially the same, material. In other embodiments, the refractive indices of the upper and lower layers 30 and 10 may be mismatched. In the embodiment of FIGS. 1 to 3 the refractive index of the fibre 18 is different from that of the substrate 10 and the cladding 30 by about 0.1.

FIG. 4 shows a continuous wave Raman laser device 40 having a pump laser 41, an input lens 42, a convoluted fibre 43 of Raman laser material (in this case Ba(NO$_3$)$_2$) embedded in a glass laser body 44, and an output/collimating lens 45.

The laser body 44 has a large surface area (upper and lower planar surfaces). This facilitates cooling. In some embodiments a cooling device, or heat exchanger, may be provided operatively coupled to one or both flat surfaces. The fibre 43 may be provided close enough to the surface of the body 44 to facilitate cooling.

FIG. 5A illustrates a laser device 50 comprising a fabricated convoluted laser fibre 51 carried by substrate 52, and a laser diode 53 connected to the end of the fibre 51. The laser diode has an electrical power supply (not shown). This enables an integrated laser diode and laser fibre optic to be provided. It will be appreciated that the laser fibre 51 may emit laser radiation of a different wavelength from that of the diode 53 and by choosing the length of the laser fibre 51 appropriately the device 50 could emit more than one wavelength of laser light (e.g. at transmissions between pump light and first Stokes emissions, or at transmissions between different Stokes emissions, and/or transmissions with Anti-Stokes emissions).

FIG. 5B shows a wavelength-changer, or colour-changer, unit 55 which can be optically coupled to the laser output of the device 50. The unit 55 has a further length of laser fibre 56, and that further length, in use, enables a different, higher order, Stokes and/or Anti-Stokes emission to dominate the light output (the predominant λ of laser light at a point in the length of a Raman material laser fibre is dependent upon the length of the fibre to that point). For example, the diode 53 may be a blue laser diode. The laser light emitted by device 50 may be green laser light. The light emitted by device 50 with unit 55 coupled to it may be red laser light. Thus, using only three components it is possible to produce blue, red, and green light, and hence by appropriate combinations, light of any colour.

Figure 7:
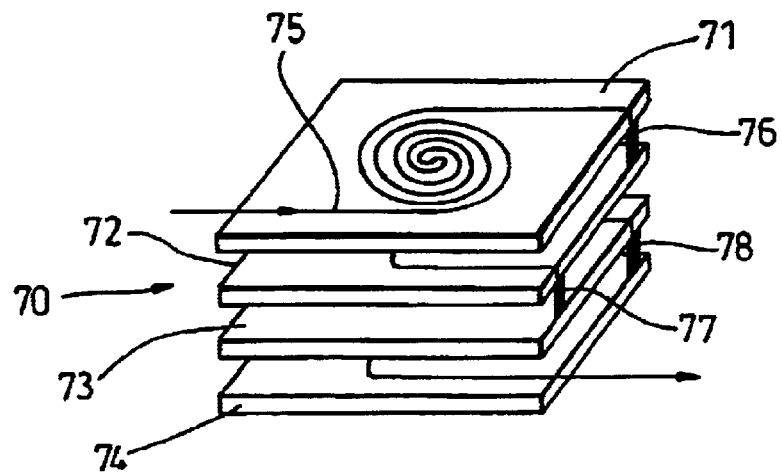
FIG. 7 shows a laser device comprising a stack of substrate-with-serpentine laser fibre elements.

FIG. 7 shows a laser device 70 which has the length of its laser fibre increased by having several plates, or bodies, 71,72,73,74 each with a serpentine/convoluted fibre 75, and optical couplers 76,77,78 connecting the ends of the fibres of each plate.

It will be appreciated that different bodies 71–74 could have laser fibres of different material (and hence emit laser light of different wavelengths). Similar considerations apply to the arrangement of FIG. 5B, where the fibre 56 of the unit 55 may be of a different material to that of the fibre 51 of the device 50.

Figure 8A:
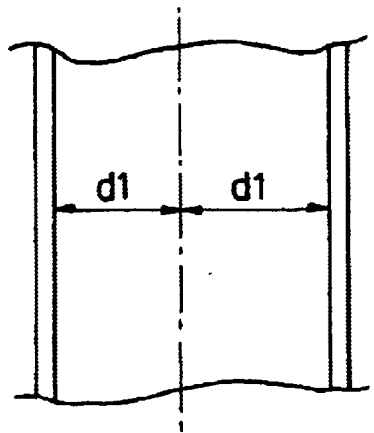
FIGS. 8A and 8B show the effective radius of cladding of a clad patterned laser fibre.
Figure 8B:
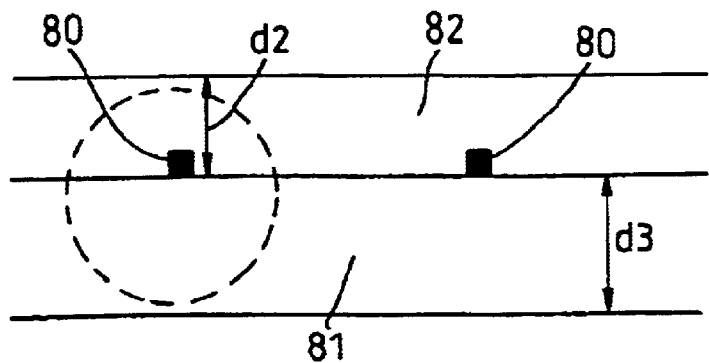

FIGS. 8A and 8B illustrate conceptionally the fact that a laser fibre 80 formed on a substrate 81, and with a protective covering layer 82 overlying it, can be considered to be a fibre core clad with cladding above and below of a diameter relating to $d_1$, $d_2$, or $d_3$. The lateral spacing between adjacent parts of the fibre, the depth of the protective layer $d_2$, and the depth of the substrate $d_3$ determine the effective cladding radius. The smallest clad thickness dominates the effective cladding radius.

The substrate and protective coating/layer will usually have the same refractive index, and there will almost always be a mis-match between the refractive index (at the λ of interest) of the laser fibre material and the refraction index of the substrate. (One very unusual circumstance where there may not be a significant refractive index mis-match is if it was desired to have the light leak out, for example part-way along a fibre (where there could perhaps be a region of non-mis-matched couplant-particle fibre).) If the mis-match in refractive index is very large (e.g. of the order of 0.1) then the cladding diameter can be small, for example 2 or 3μ, giving a separation of 4–5μ for adjacent lines of laser fibre. With such large mis-match in η, the device can be made more compact, but optical transmission is likely to be multi-mode. With a smaller mis-match in refractive index (e.g. 0.01) then it may be necessary to have a fibre separation of the order of 100μ, but transmission is likely to be Gaussian. The substrate and protection layer material(s) is/are low-loss glasses/polymers in the example of FIGS. 1 to 8.

Figure 9:
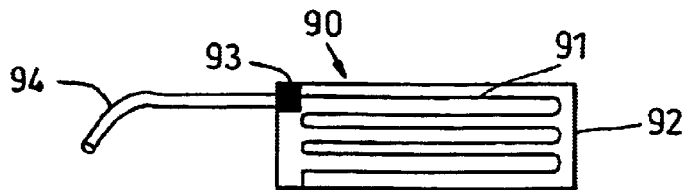
FIG. 9 shows another laser fibre device.

FIG. 9 shows a laser diode 90 having a semiconductor laser material fibre 91 fabricated on a substrate 92. The semiconductor laser fibre device is connected to biasing electrodes 93. A power supply 94 electrically energises the device and electrically stimulates the fibre 93 to emit laser radiation. The substrate 92 may be a silicon substrate. The fibre 91 may be doped regions of the substrate.

Figure 10A:
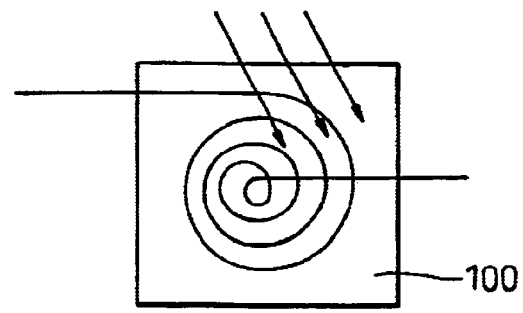
FIGS. 10A and 10B show ways of optically pumping a laser device in accordance with the invention.
Figure 10B:
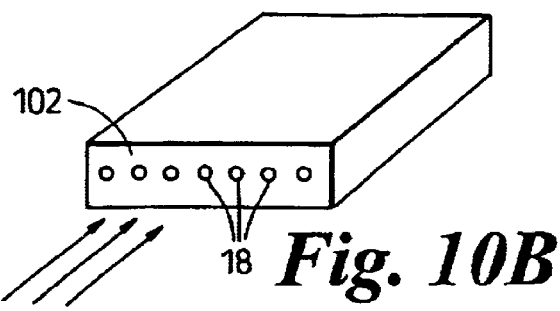

FIGS. 10A and 10B illustrate that the laser fibre could be optically pumped by irradiating a surface 100, or 102 of the body that carries the fibre. The radiation may be incident upon a plan surface 100 (as shown in FIG. 10A) or the radiation may be applied to a side, or edge surface 102 of the body (as shown in FIG. 10B). The radiation is preferably applied substantially normal to the surface that it encounters. The radiation could, of course, enter the end of the fibre, along the elongate direction of the fibre. The pumping may be used either on its own for a "laser" version, or with an applied signal as a Raman amplifier. This mode of operation will not generate the initial Raman output.

Figure 11A:
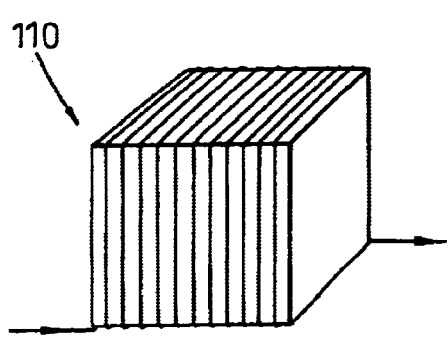
FIGS. 11A and 11B show patterned laser-fibre bodies in accordance with the present invention.
Figure 11B:
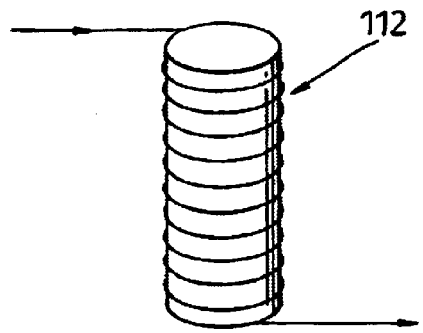

FIGS. 11A and 11B show three-dimensional bodies 110 (cube), 112 (cylinder), which carry/have the laser fibre fabricated on their surfaces. They will preferably be coated with a protective coating/cladding.

It will be appreciated that laser bodies may have fabricated/patterned laser material fibres created inside them, and not just upon their outer surface. For example, further substrate material can be deposited to embed one layer of laser fibre and create a fresh substrate surface for another layer of laser material fibre. A body may have a few, several, or many, layers of fibre.

The thin planar coating or layer 12 of FIG. 1 was made by epitaxial growth, and then the surface layer 12 was micromachined to form the folded pattern by a conventional micromachining technique, which in the example of FIG. 2 is ion beam etching.

Techniques to create a generally two-dimensional layer of laser material include: gas/vapour phase epitaxial growth; liquid phase epitaxial growth, chemical vapour phase deposition, evaporative techniques, or crystal-growing techniques, or any other material-depositing technique, for example those used in the semiconductor industry. The layer of laser material may even be formed by bonding a layer or body of laser material to the substrate. For example a bulk material layer of laser material may be adhered to a substrate and, if desired, the depth of the layer of laser material reduced by mechanical polishing, or by any suitable technique.

The layer of laser material 12 can be patterned into the desired folded fibre structure by any suitable technique, but those used in the micromachining of semiconductor wafers are preferred since they are well understood and the equipment exists. Thus, etching, chemically or optically (e.g. laser etching), may be used. Photolithographic techniques may be used, and possibly with masks or resists, or laser etching with or without a mask may be used.

Of course, an alternative to depositing a two-dimensional area of laser material and then micromachining a one-dimensional laser fibre is to create/deposit a substantially one-dimensional laser fibre in the first place. This may be achieved with molecular beam epitaxy, or by applying a resist layer/patterned layer before the laser material is deposited (possibly with the step of removing the resist layer, and the laser material that overlies it, after deposition of the laser material). Techniques used in the semiconductor industry can be used to deposit the folded pattern of laser material.

The devices of the Figures typically have a laser fibre of a few microns in cross-section but of several, or many meters in length, but fit onto a substrate of around 1 cm in diameter. The folded path for the fibre gives compact waveguide formation, and it may be easier to make a compacted length of laser fibre than a rectilinear length. Post-manufacturing handling is also simplified. A Diamond laser material device of the kind shown in FIG. 2 or 4 would produce continuous wave laser output with a power of tens or even hundreds of Watts and yet be the size of a thumbnail, with almost complete conversion from the pump laser into Raman wavelengths.

The shape of the compacted-line of laser fibre can be any suitable shape, but spiral and concertina may be desirable. The arrangement of FIG. 4, with the centre part of a spiral formation being formed by a loop of fibre with no free end enables the two free ends to be at the outer periphery of the shape. Arrangements which have the free ends of the fibre at the outside of the area of the convoluted fibre are preferred. It is preferred to avoid the fibre crossing itself, at least in the same plane.

One possible use for the fabricated fibre laser material devices is as a way of making a multicolour laser diode device for, say, projection television systems. Such a device may have a diode laser, preferably combined in situ. This could be an economical way of providing laser colour television. Protection for such a device is sought.

The invention may well have its primary use as an efficient optically pumped continuous wave Raman laser, but the same techniques could be used to produce an efficient conventional solid state laser using an appropriate laser material. Raman or conventional solid state lasers could be operated in pulsed mode or continuos wave mode. Certain laser variants (e.g. semiconductors) could be electrically pumped by adding appropriate electrodes to the stimuli. The length of fibre is preferably chosen such that the interaction length is such as to achieve efficient Raman conversion of a CW laser (preferably 100 mW to several kWs).

Although the text refers to "optical", no restriction on protection to visible light wavelengths is intended—in principle any e.m. radiation could be employed. However, the invention is seen to have especial applications to the visible wavelengths.

FIGS. 12 and 13 identify some laser materials of interest. Of particular interest may be Diamond, Barium Nitrate, and Potassium Gadolinium Tungstate.

It will be appreciated that the invention can in one sense be seen as turning a two-dimensional layer of laser material into a one-dimensional line or fibre of laser material. Of course, depositing a one-dimensional line is also part of the invention, but it may be easier to deposit a substantially uniform film and remove unwanted material.

An alternative technique for fabricating a laser fibre could be to diffuse ions into the Raman substrate to form the fibre light guide path. Certain ions, like Titanium ions, for example, are known to raise the refractive index of some non-linear optical crystals (see for example "Review analysis of diffusion in lithium niobate)", D. P. Birnie III, Journal of material science, vol. 28,pp 302–304, 1993: "Titanium in-diffused $LiNbO_3$ optical waveguide fabrication", L. W. Stulz, Applied Optics, Vol. 18, No. 12, pp 2041–2044 1979; "Metal-indiffused optical waveguides in $LiNbO_3$", applied Physics Letters, Vol. 25, No. 8, pp 458–460, 1974. The ions are usually incorporated by thermal diffusion, and, in the case of Titanium, the technique is called Titanium indiffusion. The method is to first coat the surface with a Titanium (or other) ion bearing medium. On heating, some of the metal ions diffuse into the surface and raise the refractive index of the underlying material. In this way, if the ion bearing coating is applied in a pattern (i.e. in a spiral, labyrinthine, folded, convoluted, back-tracking or serpentine pathway), then a corresponding guiding region is formed immediately underneath the coating layer. This method differs from other stated methods in that no machining, etching or material removal is necessary.

Metal indiffusion raises the refractive index to form the guiding region, whereas the other methods discussed effectively reduce the refractive index of the material surrounding the guiding region. Metal indiffusion also does not require the Raman material to be polished back to, or deposited as, very thin layers; the indiffusion temperature and duration control the overall penetration depth of the metal ions. In this way, shallowing guiding layers can be created on the top of comparably thick substrates.

What is claimed is:

1. A Raman laser device, said device comprising:
   a substrate; and
   one of a fabricated fibre and waveguide of Raman material carried by said substrate, wherein said Raman material, when optically pumped, produces at least one of Stokes and anti-Stokes emissions, wherein said one of said fibre and waveguide has a folded path.
2. A device according to claim 1, wherein said one of said fibre and waveguide has a diameter of the order of 1–10 µm and a length of at least one meter.
3. A device according to claim 1, wherein one of said fibre and waveguide of Raman material is machined from a layer of Raman material.
4. A device according to claim 1, wherein the substrate has a flat surface occupying a plane and the one of said fibre and waveguide lies at said surface, substantially at or in the plane, and in which the fibre or waveguide has a plurality of line portions which follow substantially the same path, but spaced apart, forming an array of lines.
5. A device according to claim 1, further including an incorporated laser diode provided in situ at the substrate.
6. A device according to claim 1, wherein one of a protective coating, cladding, and covering extends over the one of said fibre and waveguide.
7. A device according to claim 1, wherein said device comprises a three-dimensional body, and wherein the one of said fibre and waveguide is one of on, in, and near at least one external surface of the body.
8. A device according to claim 1, wherein the device comprises a plurality of bodies, each body has at least one of said fibre and waveguide formed at least adjacent a substrate, wherein the at least one of said fibres and waveguides of each of the bodies is operatively coupled together.
9. A device according to claim 1, wherein the at least one fibre and waveguide has a length of at least a meter.
10. A method according to claim 1, wherein said one of a fabricated fibre and waveguide of Raman material comprises a fibre which meanders over the surface so as to have a relatively long length of fibre in a compact surface area.
11. A Raman laser device, said device comprising:
    a substrate; and
    one of a fabricated fibre and waveguide of Raman material carried by said substrate, wherein said Raman material, when optically pumped, produces at least one of Stokes and anti-Stokes emissions, wherein one of said fibre and waveguide of Raman material is formed from a substrate by modifying the refractive index of at least part of the substrate to define said one of said fibre and waveguide with a different refractive index from the substrate alongside the fibre and waveguide.
12. A Raman laser device, said device comprising:
    a substrate; and
    one of a fabricated fibre and waveguide of Raman material carried by said substrate, wherein said Raman material, when optically pumped, produces at least one of Stokes and anti-Stokes emissions, further including a plurality of Raman materials generating different laser lines.
13. A device according to claim 12, wherein said different laser lines comprise colours in the visible spectrum.
14. A method of manufacturing a Raman laser device comprising the steps of:
    (i) providing a substrate; and
    (ii) forming a folded path in at least one of an elongate fibre of Raman material on said substrate and a waveguide of Raman material in said substrate, wherein the Raman material, in response to optical pumping, produces one of Stokes and anti-Stokes emissions.
15. A method according to claim 14, wherein said said forming step comprises the step of removing regions of Raman material from the said substrate.
16. A method according to claim 14, including the additional step of applying one of a protective cladding and coating over the formed Raman material.
17. A method according to claim 14, including the additional steps of: mounting laser diode on the substrate, and coupling the at least one fibre and waveguide to the laser diode.
18. A method according to claim 14, wherein the forming step comprises a micromachining patterning technique.
19. A method according to claim 14, wherein the forming step comprises an ion diffusion technique.
20. A method according to claim 14, including the additional steps of: creating a laser diode in the substrate, and coupling the waveguide to the laser diode.
21. A method of manufacturing a Raman laser device comprising the steps of:
    (i) providing a substrate; and
    (ii) forming at least one of an elongate fibre of Raman material on said substrate and a waveguide of Raman material in said substrate, wherein the Raman material, in response to optical pumping, produces one of Stokes and anti-Stokes emissions, wherein the step of forming comprises the steps of forming a layer of Raman laser material to overlie the substrate and patterning the layer of Raman laser material to provide one of an elongate fibre and waveguide.
22. A method according to claim 21, wherein the patterning step comprises the step of creating at least one of a folded, convoluted, and generally concentric path of Raman laser material.
23. A method of manufacturing a Raman laser device comprising the steps of:
    (i) providing a substrate; and
    (ii) forming at least one of an elongate fibre of Raman material on said substrate and a waveguide of Raman material in said substrate, wherein the Raman material, in response to optical pumping, produces one of Stokes and anti-Stokes emissions, wherein the forming step includes the step of changing the refractive index of at least a part of the substrate so as to define said at least one of said fibre and waveguide with a refractive index different from the refractive index of the adjacent substrate.

24. A method of forming a Raman laser body, said method comprising the steps of:
(a) forming a plurality of Raman laser devices comprising the steps of:
(i) providing a substrate; and
(ii) forming at least one of an elongate fibre of Raman material on said substrate and a waveguide of Raman material in said substrate, wherein the Raman material, in response to optical pumping, produces one of Stokes and anti-Stokes emissions; and
(b) optically coupling said at least one fibre and waveguide from each of said Raman laser devices to form said Raman laser body.

25. A method of forming a Raman laser body, said method comprising the steps of:
(a) forming a plurality of Raman laser devices comprising the steps of:
(i) providing a substrate; and
(ii) forming at least one of an elongate fibre of Raman material on said substrate and a waveguide of Raman material in said substrate, wherein the Raman material, in response to optical pumping, produces one of Stokes and anti-Stokes emissions; and
(b) optically coupling said at least one fibre and waveguide from each of said Raman laser devices to form said Raman laser body, wherein each of said plurality of laser devices comprises a different Raman material.

26. A method of manufacturing a Raman laser device comprising the steps of:
(i) providing a substrate; and
(ii) forming at least one of an elongate fibre of Raman material on said substrate and a waveguide of Raman material in said substrate, wherein the Raman material, in response to optical pumping, produces one of Stokes and anti-Stokes emissions, wherein the forming step comprises the step of depositing a surface film of Raman laser material on the substrate and removing parts of the film to leave behind a fibre which meanders over the surface so as to have a relatively long length of fibre in a compact surface area.

* * * * *